(12) United States Patent
Shen et al.

(10) Patent No.: US 6,954,594 B2
(45) Date of Patent: Oct. 11, 2005

(54) MONOLITHIC SEMICONDUCTOR COMPONENT FOR REGENERATING OPTICAL SIGNALS

(75) Inventors: Alexandre Shen, Paris (FR); Nabil Sahri, Chatenay-Malabry (FR); Jean-Yves Emery, Palaiseau (FR)

(73) Assignee: Avanex Corporation, Fremont, CA (US)

( * ) Notice: Subject to any disclaimer, the term of this patent is extended or adjusted under 35 U.S.C. 154(b) by 315 days.

(21) Appl. No.: 10/445,949

(22) Filed: May 28, 2003

(65) Prior Publication Data

US 2003/0228155 A1 Dec. 11, 2003

(30) Foreign Application Priority Data

Jun. 10, 2002 (FR) .............................. 02 07082

(51) Int. Cl.[7] .............................................. H04B 10/00
(52) U.S. Cl. ........................................................ 398/155
(58) Field of Search ......................................... 398/155

(56) References Cited

U.S. PATENT DOCUMENTS 5,446,573 A 8/1995 Lomashevitch et al.
5,761,228 A 6/1998 Yano
6,608,854 B1 * 8/2003 Watanabe ..................... 372/96
6,697,548 B2 * 2/2004 LoCascio et al. ............. 385/16

* cited by examiner

Primary Examiner—Bernarr E. Gregory
(74) Attorney, Agent, or Firm—Moser, Patterson & Sheridan, LLP

(57) ABSTRACT

For regenerating a binary optical signal ($s_d$, $s_{E2}$) a monolithic semiconductor component (100) comprises:
- a saturable absorber structure (3) having a saturable absorber section (31),
- a first optical waveguide (1, 11 to 16) defining a first guide axis (X) disposed on either side of the section (31),
- a second optical waveguide (2, 21 to 24) defining a second guide axis (Y) crossing the first axis (X) in the section (31) and disposed on either side of the section (31).

The saturable absorber structure has a dimension along the first guide axis greater than its dimension along the second guide axis.

The first and second waveguides respectively inject an optical clock signal ($c_1$) and the binary optical signal ($s_d$, $s_{E2}$). Application to optical transmission systems for regenerating signals in accordance with two different regeneration regimes.

9 Claims, 1 Drawing Sheet

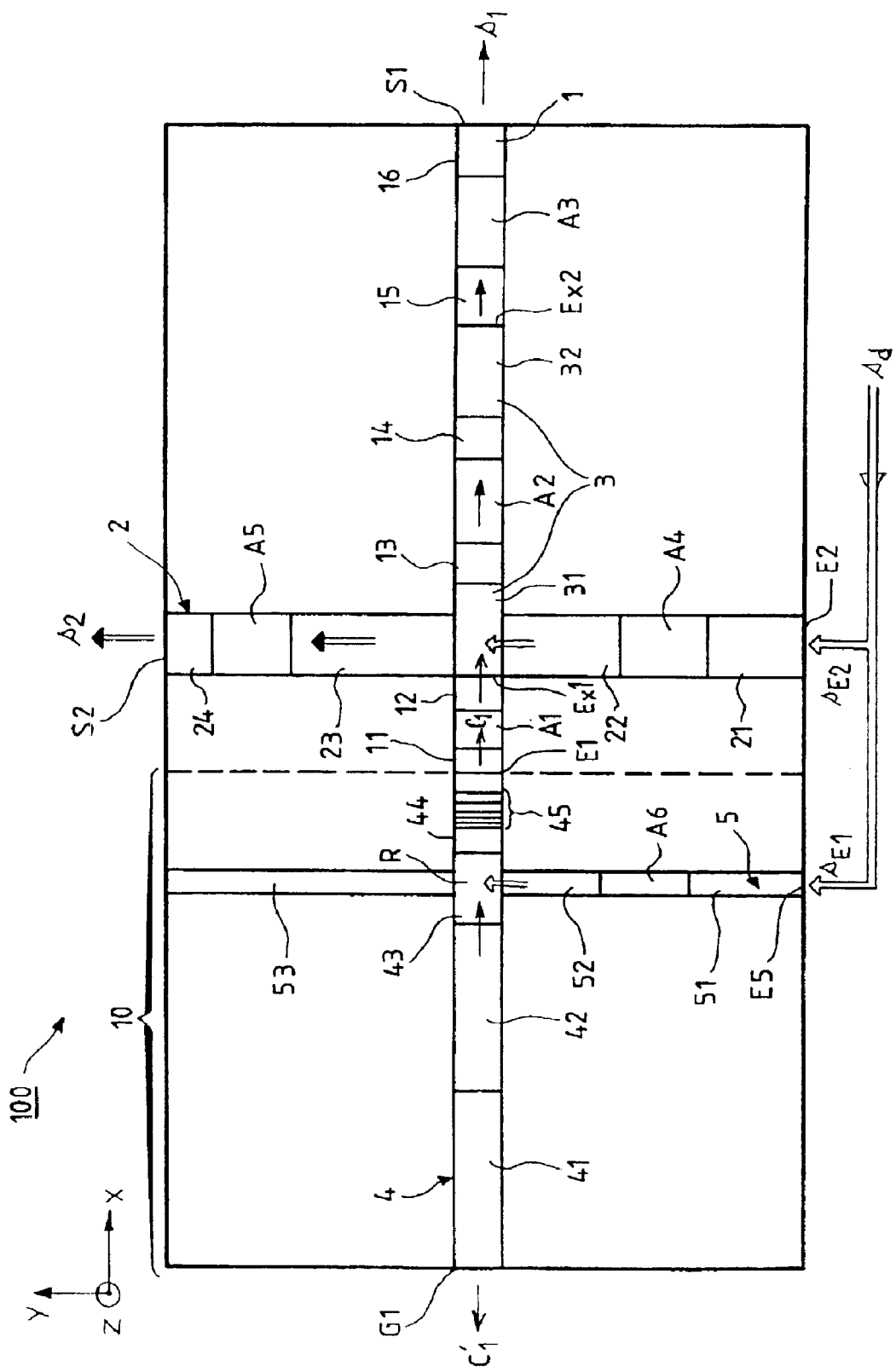

MONOLITHIC SEMICONDUCTOR COMPONENT FOR REGENERATING OPTICAL SIGNALS

The present invention relates to regenerating optical data signals, and more particularly to a monolithic semiconductor component for all-optical regeneration of an optical data signal in accordance with different first and second regeneration regimes.

BACKGROUND OF THE INVENTION

In prior art systems for transmitting binary data optically, the optical signal that is transmitted generally takes the form of an optical carrier wave that is amplitude modulated at a timing rate set by a clock. The transmitted signal then propagates through optical fibers, communication nodes and other optical telecommunication devices. As it propagates, in particular over long distances, the data signal is subjected to optical losses and is modified. It is therefore necessary to regenerate the signal to compensate cumulative unwanted noise, distortion of the signal, and time shifts.

All-optical reshaping, resynchronization, and re-amplification (3R) devices are currently at the design and development stage in research laboratories. The paper entitled "Novel Polarization-insensitive Synchronous Modulator for 20 Gbit/s All-optical Regeneration", D. Rouvillain et al., OFC 2002, TuN3, pp. 83–84, Anaheim, 2002 discloses a complex 3R regenerator. The regenerator includes an erbium-doped fiber amplifier (EDFA), a resynchronization subsystem that includes an optical cavity incorporating a saturable absorber, and an optical clock recovery system that includes a device for converting a portion of the optical data signal to be regenerated into an electronic signal which, after filtering, controls a Mach-Zehnder electro-optical modulator performing electronic to optical conversion. The modulator has its input coupled to a DC biased laser diode and outputs the optical clock in the form of a stream of pulses. After passing through the EDFA, the optical data signal to be regenerated is injected into the saturable absorber with the optical clock, previously delayed by means of an optical delay line. Reshaping of the signal is achieved by propagation in an optical fiber using a combination of non-linear (Kerr) effects and chromatic dispersion.

However, 3R regeneration is not suitable for and/or beneficial at all stages of data signal transmission, for example at the start of transmission or on reception. This type of device is not optimized for operation with all-optical telecommunication equipment (photodetectors, monitoring modules, transmission error correcting means).

OBJECTS AND SUMMARY OF THE INVENTION

The invention proposes a new all-optical regenerator that is easy to integrate, of relatively low cost, and capable of providing two independent modes of data signal regeneration for enhanced modularity of use.

To this end, the invention provides a monolithic semiconductor component for regenerating in accordance with different first and second regeneration regimes an optical data signal in the form of an optical carrier wave amplitude modulated at a modulation frequency, the regeneration using an optical clock signal with a repetition frequency substantially equal to the modulation frequency, the component comprising:

a saturable absorber structure having at one end a first saturable absorber section;

a first optical waveguide defining a first guide axis disposed on either side of the first section and adapted to inject the clock signal into the first section, an output of the first waveguide being adapted to deliver a first data signal regenerated in accordance with the first regime; and a second optical waveguide defining a second guide axis crossing the first axis in the first section and disposed on either side of the first section, the second waveguide being adapted to inject the data signal into the first section, and an output of the second waveguide being adapted to deliver a second data signal regenerated in accordance with the second regime;

the saturable absorber structure having a dimension along the first guide axis greater than its dimension along the second guide axis.

The term "monolithic" means that all the optical elements of the component are fabricated on a common substrate by epitaxially deposited stacks of majority semiconductor materials.

Because of its design, the component is inherently compact, easy to integrate into an opto-electronic module, and easy to fabricate. Furthermore, the packaging cost of the component and instabilities of mechanical origins are minimized.

The component of the invention supplies a first regenerated signal taking the form of the clock signal modulated by the data sequence carried by the data signal in the first saturable absorber section. This first signal therefore corresponds to a synchronized and shaped data signal (with narrow "1" pulses with little distortion) at a carrier wavelength corresponding to that of the injected optical clock.

The crossed configuration of the optical waveguides in accordance with the invention prevents interferometric interaction between photons from different sources: the wavelengths of the optical clock and of the signal to be regenerated can be different or the same. This first regeneration regime integrates the "wavelength conversion" function.

The length of the saturable absorber structure along the first guide axis is chosen to achieve sufficient attenuate of residual "0" pulses of the optical clock. The first regenerated data signal therefore has a sufficiently high extinction ratio (defined as the ratio of the power of the higher level associated with a "1" to the power of the lower level associated with a "0").

The component of the invention simultaneously supplies a second signal corresponding to the optical data signal "remodulated" by the optical clock in the first saturable absorber section, which behaves like an optical gate, and whose transmission is modulated at the timing rate set by the optical clock. Thus the second data signal is synchronized.

For example, the first signal can be used to transmit data and the second signal, in association with error detector/corrector means of an optical transmission system, to diagnose data errors in the disturbed signal.

The invention also applies when the data signal is a wavelength division multiplex (WDM) signal. It is not necessary to apply wavelength division demultiplexing to all the WDM channels prior to processing them all in parallel.

In this case, only the second regeneration regime is operative. The saturable absorber of the first section is sensitive to the total light power of the WDM signal, i.e. the power of all the WDM channels. Also, the total power must not exceed a limit value fixed by the saturation power of the absorber.

In this configuration, it may be beneficial to apply coarse synchronization to the WDM channels before they are injected, in order to retime overlapping bits, for example by using delay lines feeding the input of the second waveguide. The data signals delivered by the output of the first waveguide are then synchronized by the optical clock, which eliminates phase noise, which is a factor in random desynchronization of the pulses in each bit period.

The optical waveguides are passive in the sense that they are transparent at the operating wavelengths (carrier wavelength and optical clock wavelength) of the component.

The invention applies to data signals modulated with a non return to zero (NRZ) format, with a return to zero (RZ) format, or of the soliton type. The first and second signals obtained by the invention have the RZ format in all cases.

The re-amplification function can be implemented at the output of said component by a fiber amplifier or a Raman amplifier or it can be integrated into the component for either or both regeneration regimes.

It is advantageous if the structure has a second saturable absorber section disposed between the first section and the output of the first waveguide and includes a first optical amplifier disposed between the first and second saturable absorber sections.

The second saturable absorber section increases the length of the structure and therefore improves the extinction ratio of the first signal. When the first optical amplifier is used, the first regeneration regime is of the "3R" type.

An advantageous embodiment of the component further comprises:

a second optical amplifier disposed between the second saturable absorber section and the output of the first waveguide, and a third optical amplifier disposed between the first saturable absorber section and the output of the second waveguide.

Using the third optical amplifier, the second regeneration regime is of the "2R" (resynchronization, re-amplification) type.

To simplify fabrication, the first and second guide axes can be substantially perpendicular, and the first and second waveguides can take the form of a ribbon, of the conventional kind, buried or not.

In a preferred embodiment, the first saturable absorber section takes the form of a ribbon whose length is greater than or equal to the width of the second waveguide.

In this embodiment the second saturable absorber section takes the form of a ribbon longer than the ribbon of the first saturable absorber section.

For enhanced integration, the component can preferably include an optical circuit for recovering an optical clock adapted to produce a clock signal and to inject it into the input of the first waveguide.

In this configuration, the optical clock is generated from the data signal.

In an advantageous embodiment, the optical circuit for recovering an optical clock includes a mode blocking laser oscillator having a laser waveguide taking the form of a ribbon and comprising in succession along the first axis a gain section, a phase section, and a saturable absorber section. The device further includes a secondary optical waveguide taking the form of a ribbon with a guide axis separate from the first guide axis and adapted to inject a secondary signal extracted from the data signal into the saturable absorber section.

The output signal of the recovery circuit is a stream of clock pulses of good quality (symmetrical shape, time stability, etc.). The time width of the clock pulses is set by the chosen spectral width of the gain.

In another preferred embodiment, the optical circuit for recovering an optical clock includes a self-pulsing laser oscillator having a laser waveguide taking the form of a ribbon and including in succession along the first axis a gain section, and a phase section. The circuit further includes a secondary optical waveguide taking the form of a ribbon having a guide axis separate from the first guide axis and adapted to inject into the gain section a secondary signal extracted from the data signal.

Using a self-pulsing laser oscillator has the advantage of low implementation constraints and good tolerance in operating criteria.

Said structure, and where applicable the clock recovery circuit, preferably use an electrodeless saturable absorber element that is preferably selected from the group comprising irradiated, implanted, low-temperature growth and dislocation saturable absorber elements.

These elements are known in the art, and unlike electro-absorber modulators that can be used as saturable absorbers, they do not need to be electrically energized, which simplifies the structure and fabrication of a component of the invention.

Dislocation saturable absorbers are described in particular in patent application FR-A-2 784 202.

The absorbers chosen can be fast, i.e. can have a response time of the same order of magnitude as the time width of the ultrashort optical clock pulses. The response time is approximately 2.5 picoseconds (ps) for a clock frequency of 160 giga hertz (GHz), for example.

BRIEF DESCRIPTION OF THE DRAWINGS

Features and objects of the present invention will emerge from the following detailed description which is provided by way of illustrative and non-limiting example and refers to the accompanying drawing.

The single FIGURE is a diagrammatic top view of a preferred embodiment of a monolithic semiconductor component.

MORE DETAILED DESCRIPTION

For example, the monolithic semiconductor component 100 is designed for all-optical regeneration under different first and second regeneration regimes of an optical data signal $s_d$ taking the form of an amplitude modulated optical carrier wave in band C (1.535 micrometers (1 µm)–1.560 µm), for example at 160 gigabits per second (Gbit/s). It uses an optical clock signal $c_1$ with a repetition frequency of approximately 160 GHz.

The component 100 is monolithic in the sense that it is made up of stacked majority semiconductor materials deposited epitaxially on a common InP substrate along a vertical axis Z.

The component 100 primarily comprises:

a first monomode ribbon waveguide 1 which has a longitudinal axis X along which optical signals are guided between an input E1 and an output S1 and is divided into six discontinuous waveguide sections 11 to 16 including a guide layer (not visible) of a material that is transparent to wavelengths in band C, a second monomode ribbon waveguide 1 which has a lateral guide axis Y along which optical signals are guided between an input E2 and an output S2 and is divided into four discontinuous waveguide sections 21 to 24 including a guide layer (not visible) of a material transparent to wavelengths in band C, an electrodeless saturable absorber structure 3 that is produced by ionic irradiation, for example, and includes, between an optical signal input end Ex1 and an optical signal output end Ex2:

a first ribbon geometry saturable absorber section 31 disposed at the intersection of the guide axes X and Y and respectively interleaved between waveguide sections 12 and 13 of the first waveguide 1 and waveguide sections 22 and 23 of the second waveguide 2, a second ribbon geometry saturable absorber section 32 disposed downstream of the first section 1 along the longitudinal axis X and interleaved between waveguide sections 14, 15 of the first waveguide 1.

The ribbon of the first saturable absorber section 31 has a length of 3.5 µm along the longitudinal axis X and a width of 2.5 µm along the lateral axis Y.

The ribbon of the second saturable absorber section 32 has a length of 9 µm along the longitudinal axis X and a width of 2.5 µm along the lateral axis Y.

The photoluminescence spectrum of the saturable absorber is adjusted to contain the wavelengths of the carrier wave and the optical clock, which are also in band C.

The ribbons of the first and second waveguides 1, 2 are respectively 2.5 µm and 3 µm wide.

Three semiconductor optical amplifiers (SOA) A1, A2, A3 in the form of ribbon amplifier sections are coupled to the first waveguide 1 and disposed between the waveguide sections 11 and 12, 13 and 14, 15 and 16, respectively.

Two semiconductor optical amplifiers (SOA) A4, A5 also in the form of ribbon amplifier sections are coupled to the first waveguide 2 and disposed between the waveguide sections 21 and 22, 23 and 24, respectively.

The FIGURE is not to scale: the length of the SOA is of the order of 300 µm.

An optical circuit 10 for recovering an optical clock is integrated into the component 100 and injects the recovered optical clock $c_1$ into the input E1 of the first waveguide 1.

The optical circuit 10 for recovering the optical clock includes a mode blocking laser oscillator having a ribbon laser waveguide 4 which includes in succession along the longitudinal axis X:

a gain section 41 fed with a first carrier current (not shown) with a gain spectral width Δf equal to approximately 160 GHz, a phase section 42 fed with a second carrier current (not shown), a saturable absorber section 43 obtained by ionic irradiation, a waveguide section 44, and a Bragg grating 45 of varying pitch, the pitch preferably increasing along the axis X, with a center wavelength close to the laser wavelength, for example in band C.

The ribbon of the laser waveguide 4 is the same width as the first waveguide 1, i.e. approximately 2.5 µm wide. Because the component 100 is monolithic, it would be more accurate to say that the input E1 of the first waveguide 1 corresponds to the interface between the laser waveguide 4 and the first waveguide 1.

A ribbon secondary optical waveguide 5 with a guide axis parallel to the lateral axis Y is divided into three discontinuous waveguide sections 51, 52, 53 disposed on either side of the saturable absorber section 43. The width of the ribbon of the waveguide 5 is less than the length of the saturable absorber section 43 defining a crossed signal injection region R in the section 43.

The optical waveguide 5 is extended beyond the region R to prevent reflected waves causing interference prejudicial to the oscillator 10. The waveguide 5 can also be extended with a spiral shape. The secondary waveguide 5 is a monomode waveguide over at least a part of its length and is insensitive to the polarization of an injected input optical signal.

An SOA A6 is inserted between the input section 51, at the same end as the input E5 of the secondary waveguide 5, and the waveguide section 52 leading to the region R.

There follows next a description of the dynamic operation of the component 100 in response to an optical data signal $s_d$ received from an optical fiber (not shown) and then divided into two portions referred to as input signals $s_{E1}$, $s_{E2}$ by an optical coupler (not shown) which has two output branches of appropriate length for synchronized injection of these signals into the inputs E5, E2 of the secondary waveguide 5 and the second waveguide 2, respectively.

The production of the optical clock $c_1$ is described first.

The first input signal $s_{E1}$ propagates in the secondary waveguide 5 and is pre-amplified by the amplifier A6 before it is injected into the saturable absorber region R. At the same time, the gain section 41 injects a spontaneous amplified emission wave into the same region R. If there were no secondary waveguide, a laser optical signal in the form of a very noisy pulse stream unsuitable for use as an optical clock for the invention would be formed at the output of the waveguide.

Thanks to the secondary waveguide 5, the injected first input signal $s_{E1}$ provides optical control of the saturable absorber 43, which it illuminates at its timing rate. Even if the optical power of the signal $s_{E1}$ is insufficient for saturation to be obtained, its absorption modulates the carrier density in the region R. Accordingly, the carrier density varies with time as a sinusoidal function and the frequency of the sinusoid is substantially equal to 160 GHz.

The quality of the optical clock $c_1$—which is formed of pulses with a time width inversely proportional to the spectral width Δf (i.e. 6.3 ps) and a repetition frequency set at 160 GHz—does not depend on the quality of the first input signal $s_{E1}$. The operation of the laser oscillator goes from the passive regime—based on saturation of the absorber material by spontaneous emission from the gain section 41 in the absence of an injected signal—to a hybrid active-passive regime which is active in the region R of the section 43, the filtering of the modulated first input signal $s_{E1}$ creating the sinusoidal modulation of the carrier density. The hybrid regime is passive in the other regions of the section 43 and produces an optical clock $c_1$ of better quality, i.e. one that is stable in terms of pulse shape and time position.

The laser waveguide 4 delivers, via the end G1 that is upstream of the gain section 41 with respect to the axis X, a low-intensity clock signal $c'_1$ that can advantageously be used to monitor the quality of the optical clock $c_1$.

There follows a description of obtaining in succession the first and second data signals $s_1$, $s_2$ that are respectively regenerated in accordance with a "3R" regeneration regime and a "2R" (resynchronization, re-amplification) regeneration regime and respectively delivered by the first and second waveguides 1, 2.

The second input signal $s_{E2}$ propagates in the second optical waveguide 2 and is pre-amplified by the amplifier A4 before it is injected into the first saturable absorber section 31, which also receives the optical clock $c_1$ previously amplified by the amplifier A1.

For the optical clock $c_1$, the first section 31 serves as an optical gate passing pulses that will form "1" data pulses and attenuating pulses that will form "0" data pulses, in accordance with the data sequence to be transmitted carried by the second input signal $s_{E2}$.

The "1" pulses are amplified by the amplifier A2, pass through the second absorber section 32, which is transparent for these pulses, and are amplified again by the amplifier A3. The residual "0" pulses are weakly amplified by the amplifier A2 and are then highly attenuated by the second absorber section 32, which is made long enough for these residual pulses to constitute as low a noise level at the output as may be required. The extinction ratio of the first regenerated signal $s_1$ under the "3R" regime can therefore be adjusted to a set point value imposed by the intended application. This first regeneration regime also provides wavelength conversion if the second input signal $s_{E2}$ and the optical clock have different wavelengths.

In the second regeneration regime, which produces the second regenerated data signal $s_2$, the transmission of the saturable absorber is modulated by the optical clock $c_1$. For the second input signal $s_{E2}$, the saturable absorber acts like an optical gate that is opened at the timing rate of the clock pulses. The signal $s_{E2}$ modulated at the clock frequency is therefore resynchronized and then amplified by the amplifier A5 to form the signal $s_2$ at the same wavelength as the second input signal $s_{E2}$.

Of course, the invention is not limited to the embodiment just described. Finally, any means can be replaced by equivalent means without departing from the scope of the invention.

In particular, the optical circuit 10 for recovering the optical clock can alternatively have a conventional self-pulsing laser oscillator structure (not shown), essentially consisting of a ribbon laser waveguide comprising a gain section and a phase section in succession along the first axis. The secondary optical waveguide 5 is then disposed to inject the second input signal $s_{E2}$ into the gain section.

What is claimed is:

1. A monolithic semiconductor component (100) for regenerating in accordance with different first and second regeneration regimes an optical data signal ($s_d$, $s_{E2}$) in the form of an optical carrier wave amplitude modulated at a modulation frequency, said regeneration using an optical clock signal ($c_1$) with a repetition frequency substantially equal to said modulation frequency, said component comprising:

a saturable absorber structure (3) having at one end (Ex1) a first saturable absorber section (31);

a first optical waveguide (1, 11 to 16) defining a first guide axis (X) disposed on either side of said first section and adapted to inject said clock signal ($c_1$) into said first section, an output (S1) of said first waveguide (1) being adapted to deliver a first data signal ($s_1$) regenerated in accordance with said first regime; and a second optical waveguide (2, 21 to 24) defining a second guide axis (Y) crossing the first axis (X) in said first section and disposed on either side of said first section (31), the second waveguide being adapted to inject the data signal ($s_{E2}$) into said first section, and an output (S2) of said second waveguide (2) being adapted to deliver a second data signal ($s_2$) regenerated in accordance with said second regime;

said saturable absorber structure having a dimension along the first guide axis greater than its dimension along the second guide axis.

2. A monolithic semiconductor component (100) according to claim 1, characterized in that said structure has a second saturable absorber section (32) disposed between the first section (31) and said output (S1) of the first waveguide (1) and in that it includes a first optical amplifier (A2) disposed between the first and second saturable absorber sections.

3. A monolithic semiconductor component (100) according to claim 2, characterized in that it further comprises:

a second optical amplifier (A3) disposed between the second saturable absorber section (32) and said output (S1) of the first waveguide, and a third optical amplifier (A5) disposed between the first saturable absorber section (31) and the output (S2) of said second waveguide.

4. A monolithic semiconductor component (100) according to claim 2 or claim 3, characterized in that the first and second guide axes (X, Y) are substantially perpendicular and said first and second waveguides (1, 2) take the form of a ribbon.

5. A monolithic semiconductor component (100) according to claim 4, characterized in that:

the first saturable absorber section (31) takes the form of a ribbon whose length is greater than or equal to the width of said second waveguide (2), and the second saturable absorber section (32) takes the form of a ribbon longer than the ribbon of the first saturable absorber section.

6. A monolithic semiconductor component (100) according to any of claims 1 to 5, characterized in that it includes an optical circuit for recovering an optical clock (10) adapted to produce a clock signal ($c_1$) and to inject it into the input of the first waveguide (1).

7. A monolithic semiconductor component (100) according to claim 6, characterized in that said optical circuit for recovering an optical clock (10) includes a mode blocking laser oscillator having a laser waveguide (4) taking the form of a ribbon and comprising in succession along said first axis (X):

a gain section (41), a phase section (42), and a saturable absorber section (43), and in that it includes a secondary optical waveguide (5) taking the form of a ribbon with a guide axis separate from the first guide axis and adapted to inject a secondary signal ($s_{E1}$) extracted from said data signal ($s_d$) into said saturable absorber section (43).

8. A monolithic semiconductor component according to claim 6, characterized in that said optical circuit for recovering an optical clock includes a self-pulsing laser oscillator having a laser waveguide taking the form of a ribbon and including in succession along said first axis:

a gain section, and a phase section, and in that it includes a secondary optical waveguide taking the form of a ribbon having a guide axis separate from the first guide axis and adapted to inject into said gain section a secondary signal ($s_{E1}$) extracted from said data signal ($s_d$).

9. A monolithic semiconductor component (100) according to any one of claims 1 to 8, characterized in that the saturable absorber structure (3) is provided by an electrodeless saturable absorber element.

* * * * *